US012712801B2

United States Patent
(12) United States Patent
Paczkowski et al.

(10) Patent No.: US 12,712,801 B2
(45) Date of Patent: Aug. 18, 2026

(54) WIRELESS-CENTRIC ENTERPRISE NETWORKS BASED ON SERVICE-LEVEL AGREEMENTS

(71) Applicant: T-Mobile USA, Inc., Bellevue, WA (US)

(72) Inventors: Lyle Walter Paczkowski, Mission Hills, KS (US); Anthony C. Wells, Overland Park, KS (US)

(73) Assignee: T-Mobile USA, Inc., Bellevue, WA (US)

( * ) Notice: Subject to any disclaimer, the term of this patent is extended or adjusted under 35 U.S.C. 154(b) by 344 days.

(21) Appl. No.: 18/484,283

(22) Filed: Oct. 10, 2023

(65) Prior Publication Data

US 2025/0119373 A1 Apr. 10, 2025

(51) Int. Cl.

*H04L 43/55* (2022.01)
*H04W 24/08* (2009.01)
*H04W 28/02* (2009.01)

(52) U.S. Cl.

CPC ............. *H04L 43/55* (2022.05); *H04W 24/08* (2013.01); *H04W 28/0268* (2013.01)

(58) Field of Classification Search

CPC ..... H04L 43/55; H04L 41/0895; H04L 41/40; H04L 41/5019; H04L 43/20; H04W 4/08; H04W 28/0268; H04W 24/02

See application file for complete search history.

(56) References Cited

U.S. PATENT DOCUMENTS

| | | | |
|---|---|---|---|
| 6,789,117 | B1 | 9/2004 | Joiner et al. |
| 7,283,505 | B1 | 10/2007 | Meenan et al. |
| 7,313,384 | B1 | 12/2007 | Meenan et al. |
| 7,395,065 | B2 | 7/2008 | Dorenbosch |
| 7,471,629 | B2 | 12/2008 | Melpignano |
| 7,752,329 | B1 | 7/2010 | Meenan et al. |
| 7,830,813 | B1 | 11/2010 | Lo et al. |
| 7,869,803 | B2 | 1/2011 | Corson et al. |
| 7,917,624 | B2 | 3/2011 | Gidwani |
| 8,155,014 | B2 | 4/2012 | Jennings et al. |
| 8,184,786 | B2 | 5/2012 | Lopez |
| 8,218,502 | B1 | 7/2012 | Liu et al. |
| 8,274,958 | B2 | 9/2012 | Huber et al. |

(Continued)

FOREIGN PATENT DOCUMENTS

| | | |
|---|---|---|
| CN | 103081525 B | 7/2016 |
| CN | 111093262 A | 5/2020 |

(Continued)

*Primary Examiner* — Asad M Nawaz
*Assistant Examiner* — Najeeb Ansari
(74) *Attorney, Agent, or Firm* — Perkins Coie LLP

(57) ABSTRACT

Techniques related to a framework for providing a wireless-centric enterprise network model are disclosed. In one example aspect, a framework for providing a wireless-centric network service to an enterprise in compliance with a Service Level Agreement (SLA) includes a first component in communication with a home wireless network, at least one visited wireless network, and at least one demarcation point of a wired network associated with the enterprise network to predict a future state of the networks. The framework also includes a second component configured to reconfigure traffic associated with the communication session based on the future state predicted by the first component.

20 Claims, 10 Drawing Sheets

(56) References Cited

U.S. PATENT DOCUMENTS 8,275,900 B2 9/2012 Meenan et al.
8,340,634 B2 12/2012 Raleigh
8,346,225 B2 1/2013 Raleigh
8,363,626 B2 1/2013 Faccin
8,369,830 B2 2/2013 Sperti et al.
8,391,834 B2 3/2013 Raleigh
8,396,458 B2 3/2013 Raleigh
8,406,748 B2 3/2013 Raleigh et al.
8,463,279 B2 6/2013 Holcman et al.
8,467,312 B2 6/2013 Raleigh
8,472,371 B1 6/2013 Bari et al.
8,478,667 B2 7/2013 Raleigh
8,923,853 B1 12/2014 Shaw et al.
9,559,866 B2 1/2017 Grayson et al.
9,609,510 B2 3/2017 Raleigh et al.
9,609,544 B2 3/2017 Raleigh et al.
9,706,423 B2 7/2017 Horn et al.
9,749,898 B2 8/2017 Raleigh et al.
9,749,899 B2 8/2017 Raleigh et al.
9,870,534 B1 1/2018 Wu et al.
9,961,624 B1 5/2018 Zait
10,321,371 B2 6/2019 Zhang et al.
10,484,911 B1 11/2019 Bogineni et al.
10,667,179 B1 5/2020 Young et al.
10,785,652 B1 9/2020 Ravindranath et al.
10,944,796 B2 3/2021 Verma et al.
11,026,106 B2 6/2021 Bor-yaliniz et al.
11,134,487 B2 9/2021 Samdanis et al.
11,153,813 B2 10/2021 Qiao et al.
11,197,202 B2 12/2021 Samdanis et al.
11,337,139 B2 5/2022 Foti et al.
11,431,746 B1 8/2022 Shaw et al.
11,570,638 B2 1/2023 Perez-ramirez et al.
11,683,740 B2 6/2023 Zheng
11,690,005 B2 6/2023 Qiao et al.
2005/0260973 A1 11/2005 Van
2005/0260996 A1 11/2005 Groenendaal
2007/0042791 A1 2/2007 Walter
2007/0293216 A1 12/2007 Jiang
2009/0176489 A1 7/2009 Ulupinar et al.
2009/0299788 A1 12/2009 Huber et al.
2010/0284333 A1 11/2010 Shirota et al.
2010/0296487 A1 11/2010 Karaoguz et al.
2011/0019639 A1 1/2011 Karaoguz et al.
2011/0069685 A1 3/2011 Tofighbakhsh
2012/0250570 A1 10/2012 Parker
2020/0178158 A1 6/2020 Won et al.
2023/0121268 A1 4/2023 Mueller et al.
2023/0224786 A1* 7/2023 Seetharaman ........ H04W 36/26
455/432.1
2025/0267696 A1* 8/2025 Iovanna .............. H04W 72/543

FOREIGN PATENT DOCUMENTS

CN 108353008 B 10/2020
CN 109391648 B 12/2020
CN 109565732 B 10/2021
CN 109039884 B 12/2021
CN 110431820 B 1/2022
CN 108141412 B 3/2022
EP 2955631 B1 5/2019
EP 3681105 B1 3/2023

* cited by examiner

WIRELESS-CENTRIC ENTERPRISE NETWORKS BASED ON SERVICE-LEVEL AGREEMENTS

BACKGROUND

A service-level agreement (SLA) is an agreement between a service provider and a customer. The service provider and the customer (e.g., an enterprise) reach an agreement regarding certain aspects of the service, such as quality, availability, responsibilities. The service provider may face a penalty when it fails to meet the requirements specified in the SLA.

BRIEF DESCRIPTION OF THE DRAWINGS

Detailed descriptions of implementations of the present invention will be described and explained through the use of the accompanying drawings.

Figure 1:
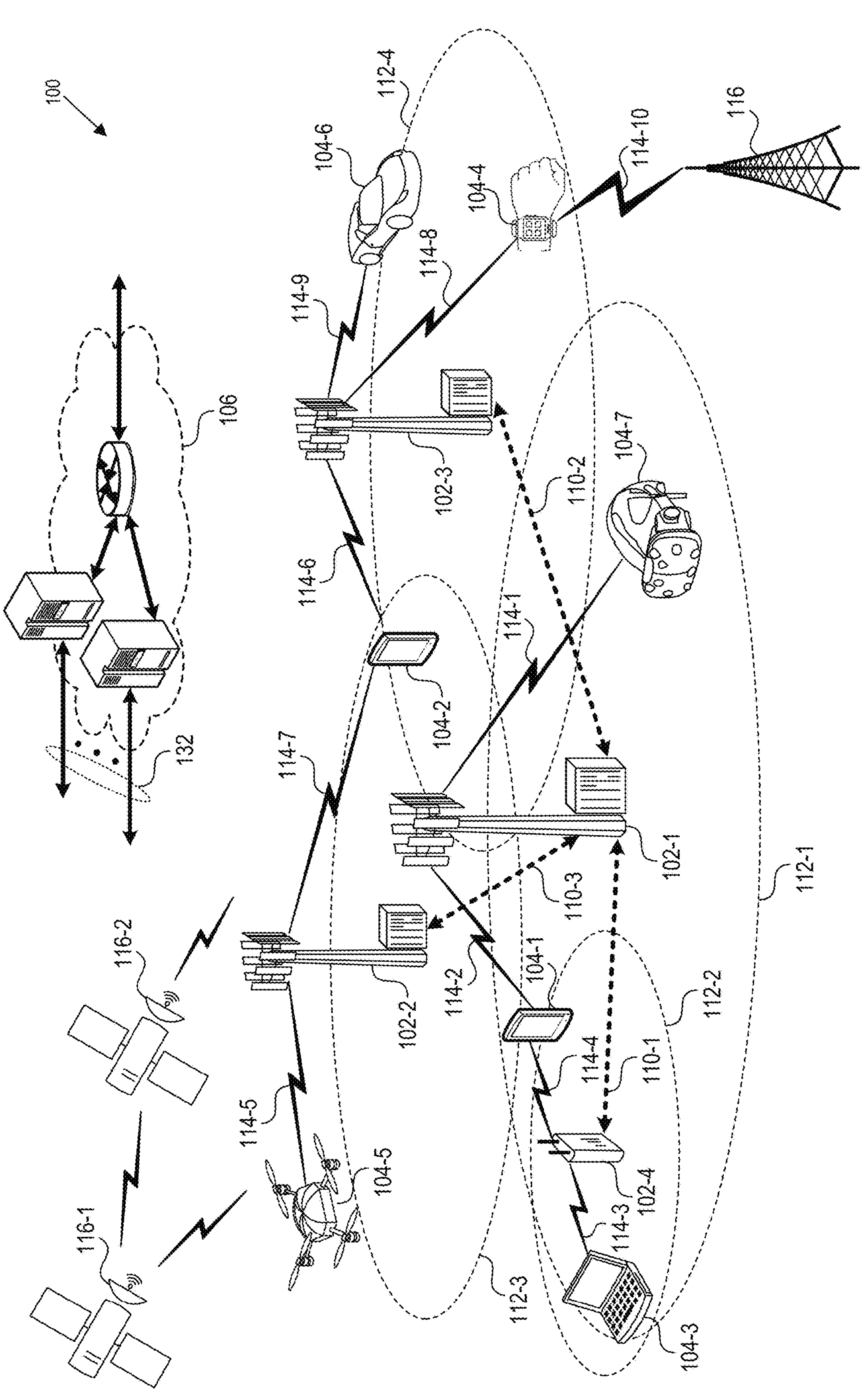
FIG. 1 is a block diagram that illustrates a wireless communications system that can implement aspects of the present technology.

The technologies described herein will become more apparent to those skilled in the art by studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

An enterprise Internet Service Level Agreement (SLA) is an agreement that addresses the network performance and service level metrics a network service provider provides to an enterprise customer. With enterprise networks shifting towards a geographically dispersed model, effectively providing the required level of service in compliance with the SLAs remains a challenge.

This patent document discloses techniques that can be implemented in various embodiments to provide a framework for a wireless-centric enterprise network model that can satisfy the requirements of SLAs. The disclosed techniques leverage capabilities in the 5G communication networks to predict upcoming changes in the networks and to promptly reconfigure the enterprise network so as to avoid undesirable network congestions and/or other types of issues. The disclosed techniques further address the challenges in cross-carrier handling of enterprise traffic using various types of networks by deploying components at the border of different networks (e.g., 3GPP wireless networks including terrestrial and non-terrestrial networks, trusted/non-trusted non-3GPP wireless networks, wired networks) to monitor network status and to make swift changes in network configurations to ensure the compliance of the SLAs. The disclosed techniques can enable flexible configuration and distributed deployment of enterprise networks.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally, or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QOS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

5G Core Network Functions

Figure 2:
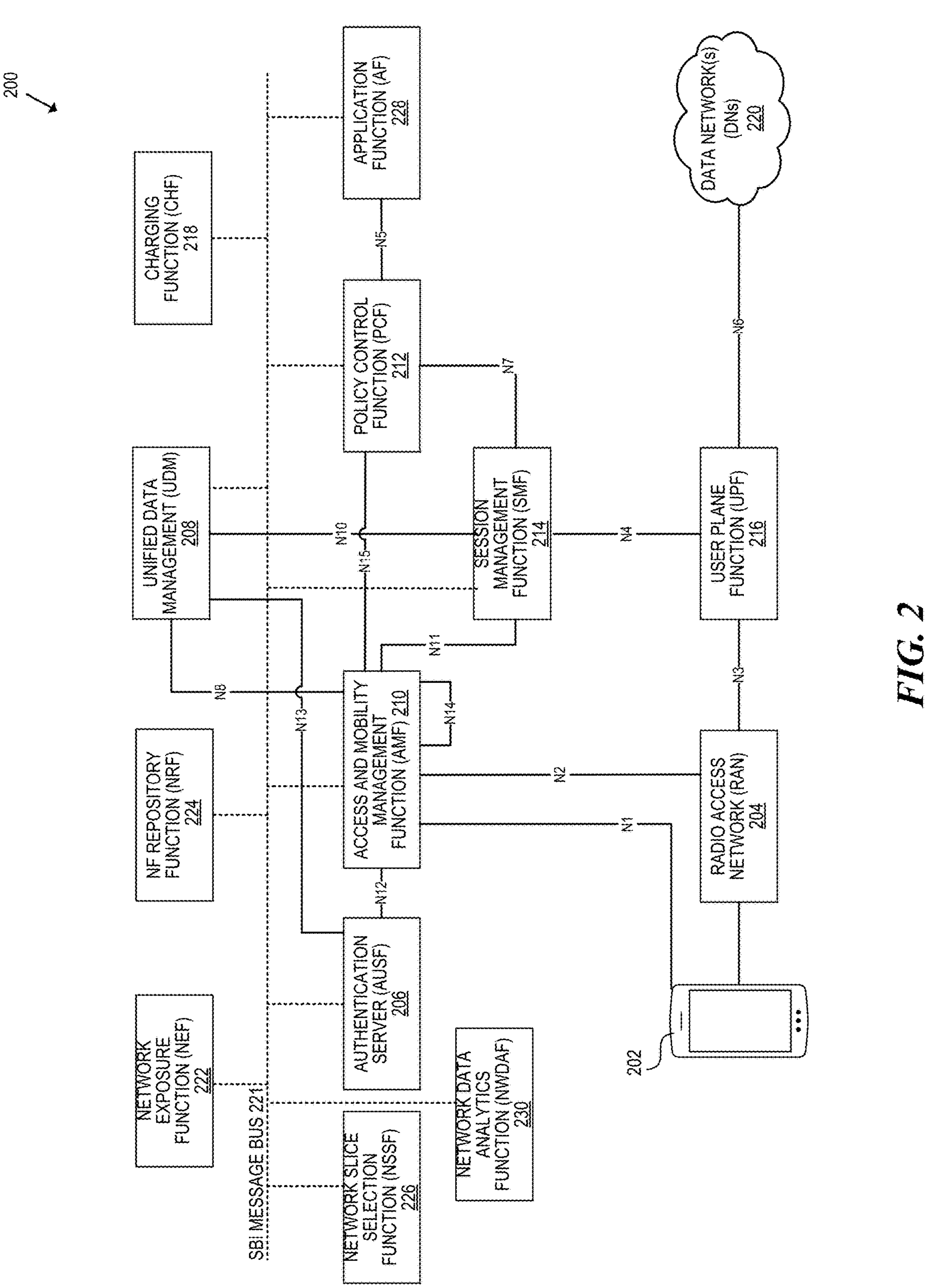
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNS) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, Network Data Analytics Function (NWDAF) 230, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, and service-level agreements and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under the Third-Generation Partnership Project (3GPP) Technical Specification 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS) and can provide authentication credentials while being employed by the AMF 210 and SMF 214 to retrieve subscriber data and context.

The PCF 212 can connect with one or more Application Functions (AFs) 228. The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them. The SCP (not shown) provides a highly distributed multi-access edge compute cloud environment and a single point of entry for a cluster of NFs once they have been successfully discovered by the NRF 224. This allows the SCP to become the delegated discovery point in a datacenter, off-loading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework that, along with the more typical QoS and charging rules, includes network slice selection, which is regulated by the NSSF 226.

Wireless-Centric Enterprise Networks

The enterprise Service Level Agreements (SLAs) establish different service level standards, such as network availability, latency, reporting, network jitter, time to repair, etc., to enterprises. Due to the challenges of providing reliable and robust services using wireless service options (e.g., satellite, WiFi, LTE/5G), which often comes as shared networks, most network operators use dedicated wired networks to provide the enterprise customers with the desired SLAs.

With the advance of the wireless technology as well as the geographically dispersed nature of the workforce, there is a need to gradually shift the wired enterprise networks to a combination of wired/wireless networks or even a wireless-centric approach. Furthermore, the 5G wireless communication system can provide optimized support for a variety of different communication services, different traffic loads and different end user communities. A communication session can be associated with different types of communication services, including but not limited to enhanced Mobile Broadband (eMBB) service, massive Internet of Things (IoT) connections, and/or Ultra Reliable Low Latency Communications (URLLO). The communication services can be provided using network slices, which are logical networks that provide specific network capabilities and network characteristics, supporting various service properties for customers.

Figure 3:
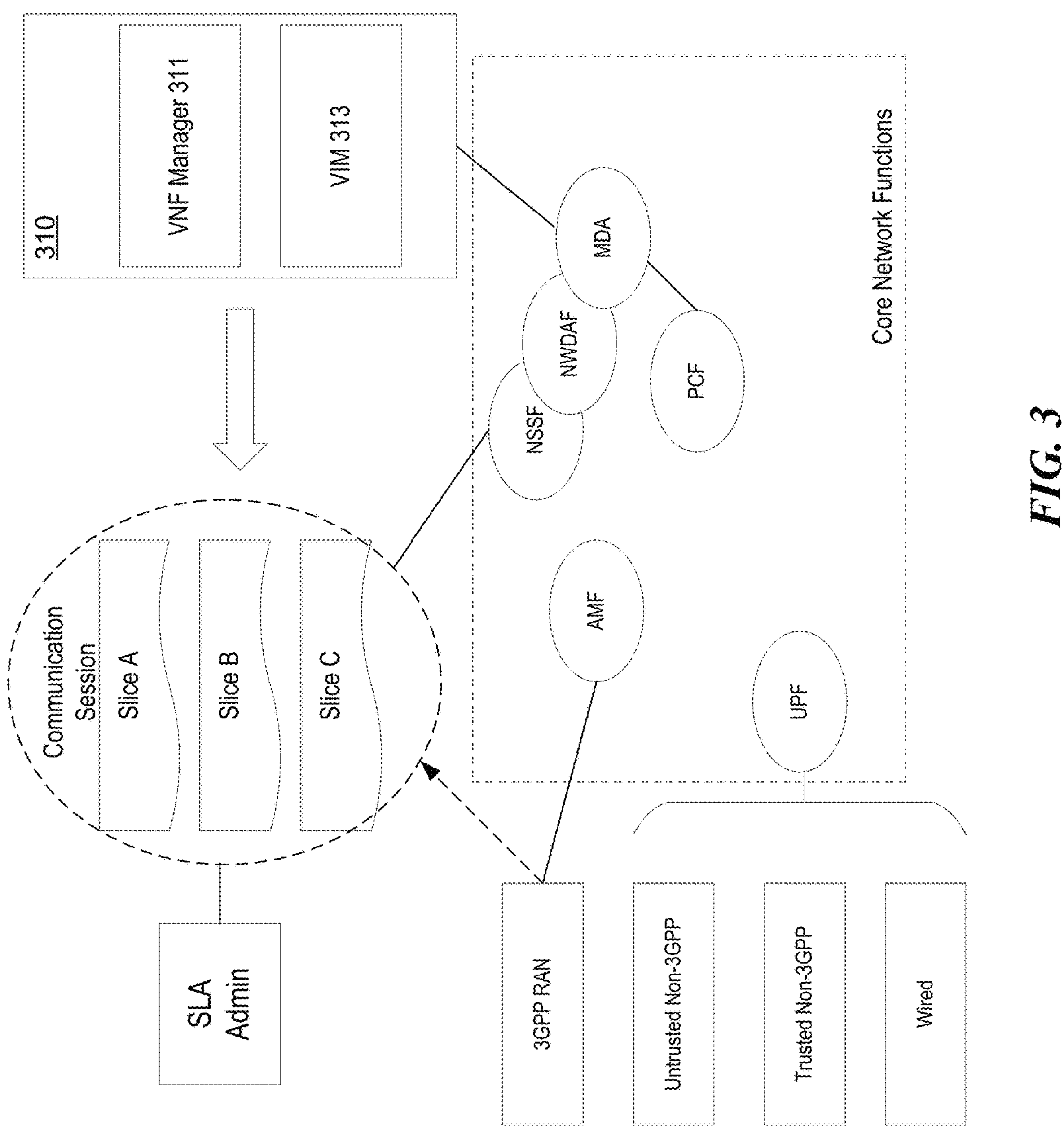
FIG. 3 illustrates an example architecture of a network management system in accordance with one or more embodiments of the present technology.

To provide the desired level of service under the framework of network slicing, a network management system in communication with different types of networks can be added to an enterprise network deployment. FIG. 3 illustrates an example architecture of a network management system in accordance with one or more embodiments of the present technology. The system shown in FIG. 3 includes a slice component manager 310 that is in communication with the core network functions to monitor, adjust, and manage the network slices. The slice component manager 310 can leverage information from the NWDAF, which monitors the traffic load on different network slices and detects/predicts changes in the network conditions to timely reconfigure the network slices or redirect traffic using a variety of access technologies, such as including terrestrial and non-terrestrial (e.g., satellite) based wireless networks, trusted/non-trusted non-3GPP accesses and/or wired local area network (LAN). The slice component manager 310 can be a part of the core network (e.g., co-located with the NSSF) or be a separate service maintained by an enterprise or provided to the enterprise by a cloud service provider.

Figure 4:
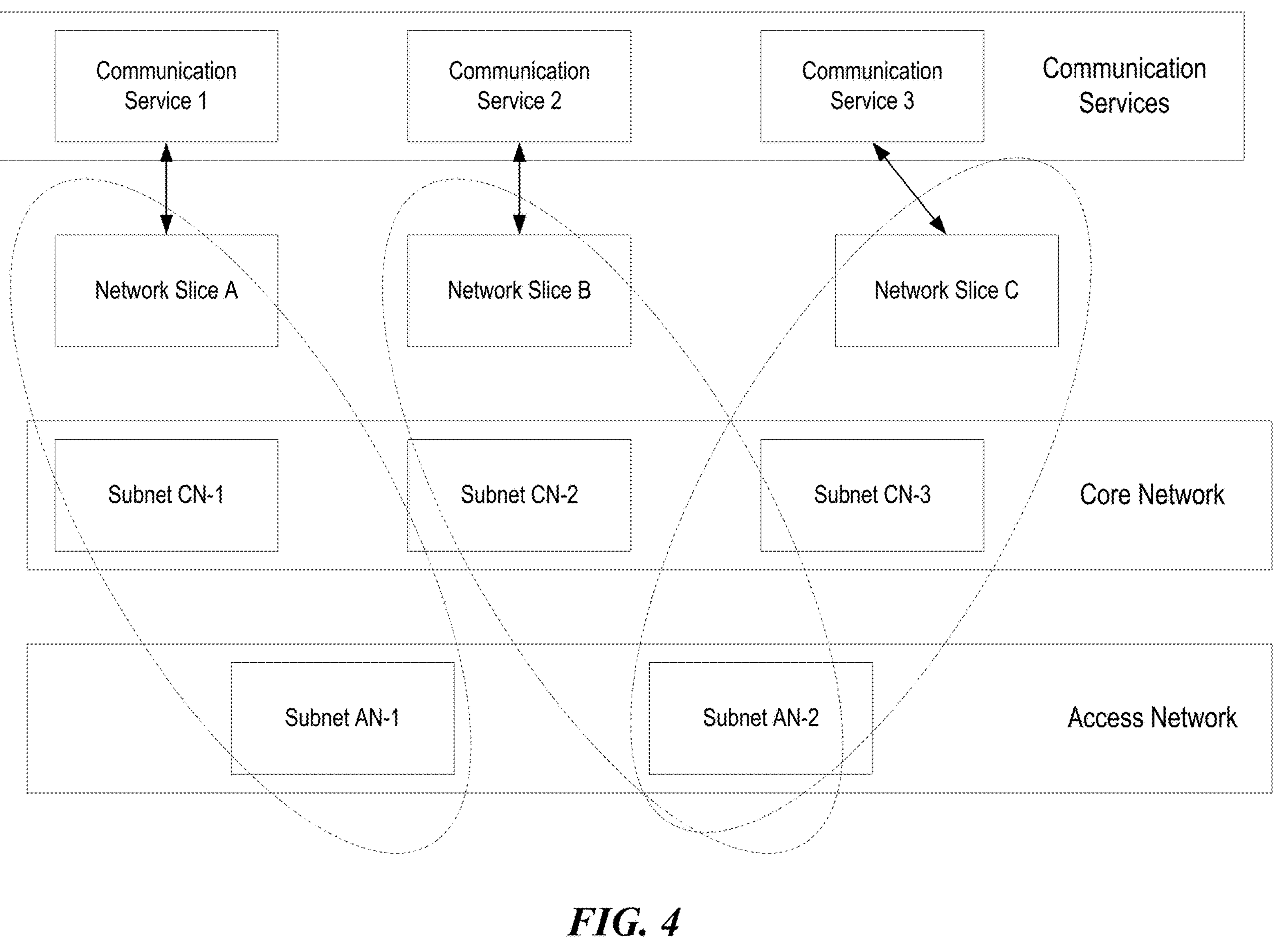
FIG. 4 illustrates an example schematic diagram of communication services, network slices, and the corresponding core network and access network subnets.

FIG. 4 illustrates an example schematic diagram of communication services, network slices, and the corresponding core network and access network subnets. Network slice is a logical concept of splitting all the resources along the data path into multiple sets, each of which is optimized for specific user devices or use cases. In some embodiments, a slice of the network is implemented using a specific set of parameters assigned to the user devices or use cases for the components on the data path for the user devices or use cases. However, having network slicing alone is insufficient to satisfy the service level metrics specified in SLAs. Achieving so requires the capability to analyze and react to constantly changing network conditions. The Network Data Analytics Function (NWDAF) is a component in 5G networks that provides data analytics capabilities for managing and optimizing network resources. The NWDAF is responsible for collecting, processing, and analyzing large volumes of network data in real time to gain insights into the network's performance, traffic patterns, and user behavior, as well as using Machine Learning and Artificial Intelligence to predict the network's performance, traffic patterns and user behavior. The NWDAF allows NF consumers to subscribe to and unsubscribe from load events of network slice instance and notifies NF consumers with a corresponding subscription about observed events.

The primary role of NWDAF is to support network automation and enable intelligent decision-making within the 5G network. The NWDAF leverages data analytics techniques, machine learning algorithms, and artificial intelligence to extract valuable information from network data. By analyzing this data, NWDAF can provide actionable insights to improve network efficiency, enhance user experience, and optimize resource allocation once implemented. A known consumer of the NWDAF is the NSSF. The NSSF takes load level information from the NWDAF into consideration for slice selection.

Furthermore, the 3GPP defines a Management Data Analytics (MDA) that provides a capability of processing and analyzing data, from the NWDAF, that is related to network and service events and status including e.g. performance measurements, QoS reports, alarms, configuration data, network analytics data, and service experience data, etc. to provide analytics output, including but not limited to statistics or predictions, root cause analysis issues, and recommendations to enable necessary actions for network and service operations.

Referring back to FIG. 3, the slice component manager 310 leverages the analytic data from NWDAF and/or MDA to dynamically adapt the network slice configurations so as to ensure the service quality promised in the SLAs. The slice component manager 310 can be implemented to include a first component (e.g., a Virtual Infrastructure Manager, VIM, 313) and a second component (e.g., a Virtual Network Function (VNF) Manager, 311). In some embodiments, the two components are deployed together in a same network node (e.g., as shown in FIG. 3). In some embodiments, the two components are deployed in a distributed manner. For example, instances of the VIM distributed across to interface with various parts of the network.

The VIM 313 interfaces with various network functions in the core network and monitors network ports to which network slices communicate through. In some embodiments, the VIM 313 interfaces with the NWDAF and/or MDA to obtain the performance measurements, QoS reports, etc. For example, the VIM 313 can monitor QoS measurements that indicate the network conditions. The example described below is based on the use of 5G Quality of Service (QOS) Indicator (5QI). Once an SLA is established for an enterprise customer, the enterprise customer is assigned one or more 5QI values for the communication based on the SLA. Table 1 shows example 5QI values and the associated characteristics.

| 5QI Value | Resource Type | Priority Level | Packet Delay Budget | Packet Error Rate | Default Max Data Burst Volume | Example Services |
|---|---|---|---|---|---|---|
| 82 | Delay | 19 | 10 ms | $10^{-4}$ | 255 bytes | Automation |
| 84 | Critical Guaranteed | 24 | 30 ms | $10^{-5}$ | 1354 bytes | Intelligent transport system |

-continued

| 5QI Value | Resource Type | Priority Level | Packet Delay Budget | Packet Error Rate | Default Max Data Burst Volume | Example Services |
|---|---|---|---|---|---|---|
| | Bit Rate (GBR) | | | | | |
| 1 | GBR | 20 | 100 ms | $10^{-2}$ | N/A | Voice |
| 2 | | 40 | 150 ms | $10^{-3}$ | N/A | Video (live streaming) |
| 3 | | 30 | 50 ms | $10^{-3}$ | NA | Real-time gaming, V2X |
| 5 | Non-GBR | 10 | 100 ms | $10^{-6}$ | | IMS signaling |
| 8 | | 80 | 300 ms | $10^{-6}$ | | Video (buffered streaming), TCP-based |
| 69 | | 5 | 60 ms | $10^{-6}$ | | Mission critical delay sensitive signaling |

The VIM 313 monitors the network communication channels and/or ports associated with the network slice(s), in a programmable measurement window (e.g., configured to be between micro-seconds to minutes), and determines that the actual 5QI values for the enterprise customer start to (or about to) fall outside of the assigned range due to network congestions or other reasons. In some embodiments, the VIM 313 sets the thresholds with respect to the 5QI values based on the information provided by the NWDAF to determine whether undesirable changes have occurred or about to occur. Upon detecting such changes, the VIM 313 can inform the VNF Manager 311 to trigger actions for network slice adjustment.

As another specific example, the SLA for the enterprise customer specifies an uplink delay of no more than 50 milliseconds. The network slice is initially prepared using appropriate network resources to meet the packet delay requirements. However, as the network conditions change, the initial network resources may not be sufficient to consistently support the required packet delay time. Upon detecting such changes, the VIM 313 can inform the VNF Manager 311 to trigger actions for network slice adjustment.

As yet another specific example, the SLA for the enterprise customer specifies a threshold for network jitter. The VIM 313 monitors multiple hops in the network to determine if there is a degradation or breakdown of the service related to network jitter. Upon detecting such changes, the VIM 313 can inform the VNF Manager 311 to trigger actions for network slice adjustment.

Furthermore, the VIM is in communication with the NWDAF/MDA to gain insights of the future state of the network. For example, the NWDAF/MDA can forecast or predict the upcoming network conditions using machine learning algorithms and/or artificial intelligence, and provide recommendations to enable necessary actions for network and service operations. Based on the information provided by the NWDAF/MDA, the VIM can inform the VNF Manager 311 to trigger actions for network slice adjustment.

Figure 5:
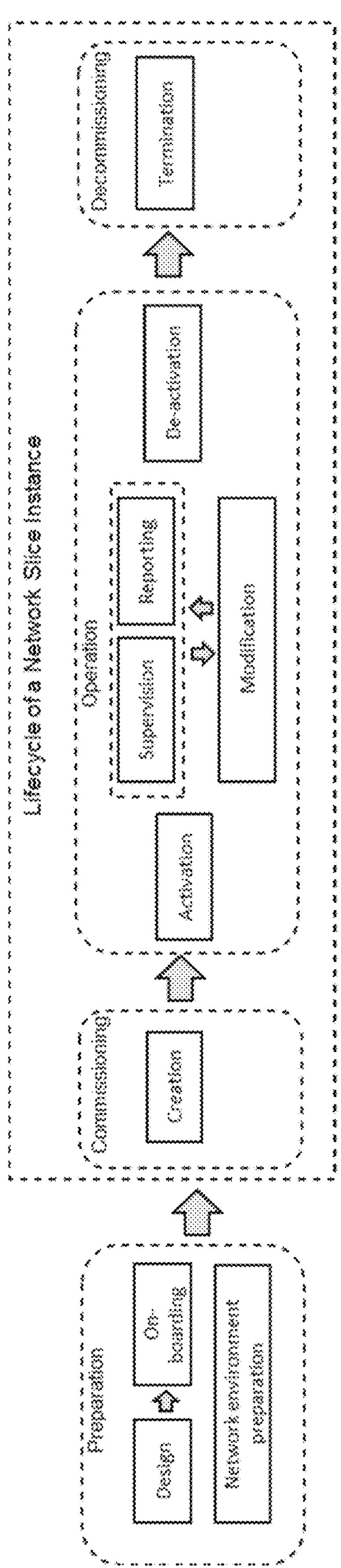
FIG. 5 illustrates an example lifecycle of a network slice instance.

The VNF Manager 311 is a component that manages the network slicing aspect of network functions. As shown in FIG. 4, each network slice is associated to a logical subnet in the core network and a logical subnet in the access network. The VNF Manager 311 manages the logical subnets associated with each network slice and is configured to adjust the subnet(s) in the core network as well as the access network in response to the necessary changes needed for the network slice. In some embodiments, the VNF Manager 311 can also be implemented to incorporate the functionality of a network slice orchestrator to manage the lifecycle of network slice instances. FIG. 5 illustrates an example lifecycle of a network slice instance. Upon receiving the notification from the VIM, the VNF Manager 311 can decommission an existing network slice instance, prepare a new instance based on the current or upcoming network changes, and commission the new instance. For example, upon determining that slice A is at 40% capacity and predicting that the usage is still increasing, the slice component manager 310 reconfigures the network slice instance to double the allocated network resources for this slice, thereby eliminating potential connection starvation that can occur on this network slice.

In some embodiments, the VNF Manager 311 determines that reconfiguration of the network slices alone is not sufficient to provide the level of services agreed in the SLAs (e.g., due to the overall network resource limitations in the cellular wireless network), the VNF Manager 311 can redirect traffic to other types of access technologies, including trusted/non-trusted non-3GPP access technologies and wired networks.

In some embodiments, the slice component manager 310 (including the VNF manager 311 and/or VIM 313) can be implemented as a Network Orchestrator or a Service Orchestrator. The network orchestration refers to actions a network controller performs in setting up devices, applications, and services in the network to achieve objectives. The service orchestration is the execution of the operational and functional processes involved in designing, creating, and delivering an end-to-end service. The SLA can be governed by the Service Orchestrator (e.g., using the network orchestrator and the slice component manager) at the service level to achieve the results.

Figure 6:
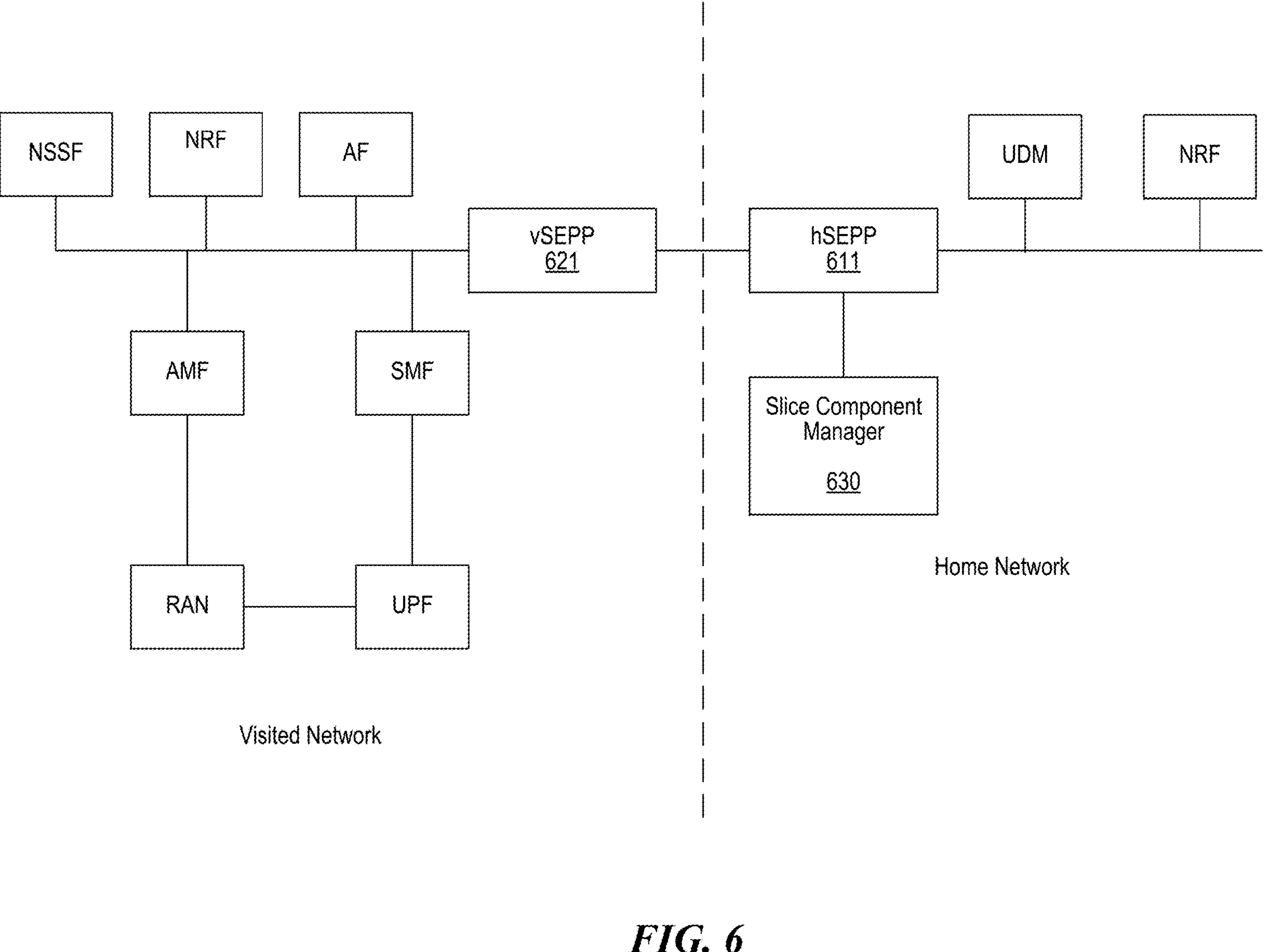
FIG. 6 illustrates an example roaming architecture in accordance with one or more embodiments of the present technology.

Traffic redirection that requires partnership between different network service providers (e.g., cross-carrier handling) continues to be a challenge and can be handled in a variety of ways. For redirections among different cellular wireless service providers, a roaming architecture can be adopted so that network slices can traverse into another carrier network(s). Given a particular established SLA, a methodology of network condition monitoring and security mitigation can be deployed at the gateways or logical borders between carriers. FIG. 6 illustrates an example roaming architecture in accordance with one or more embodiments of the present technology. In some embodiments, the slice component manager 630 can be deployed at the border between the home network and the visited network (e.g., in communication with the home Security Edge Protection Proxy, hSEPP, 611). The slice component manager 630 can be in communication with the home network and the visited network (e.g., via the visited SEPP, vSEPP, 621) to monitor the network conditions on both sides. The slice component manager 630 can direct traffic from the home network to the visited networks when necessary and redirect the traffic back when the resource allocation and network conditions improve in the home network.

Figure 7:
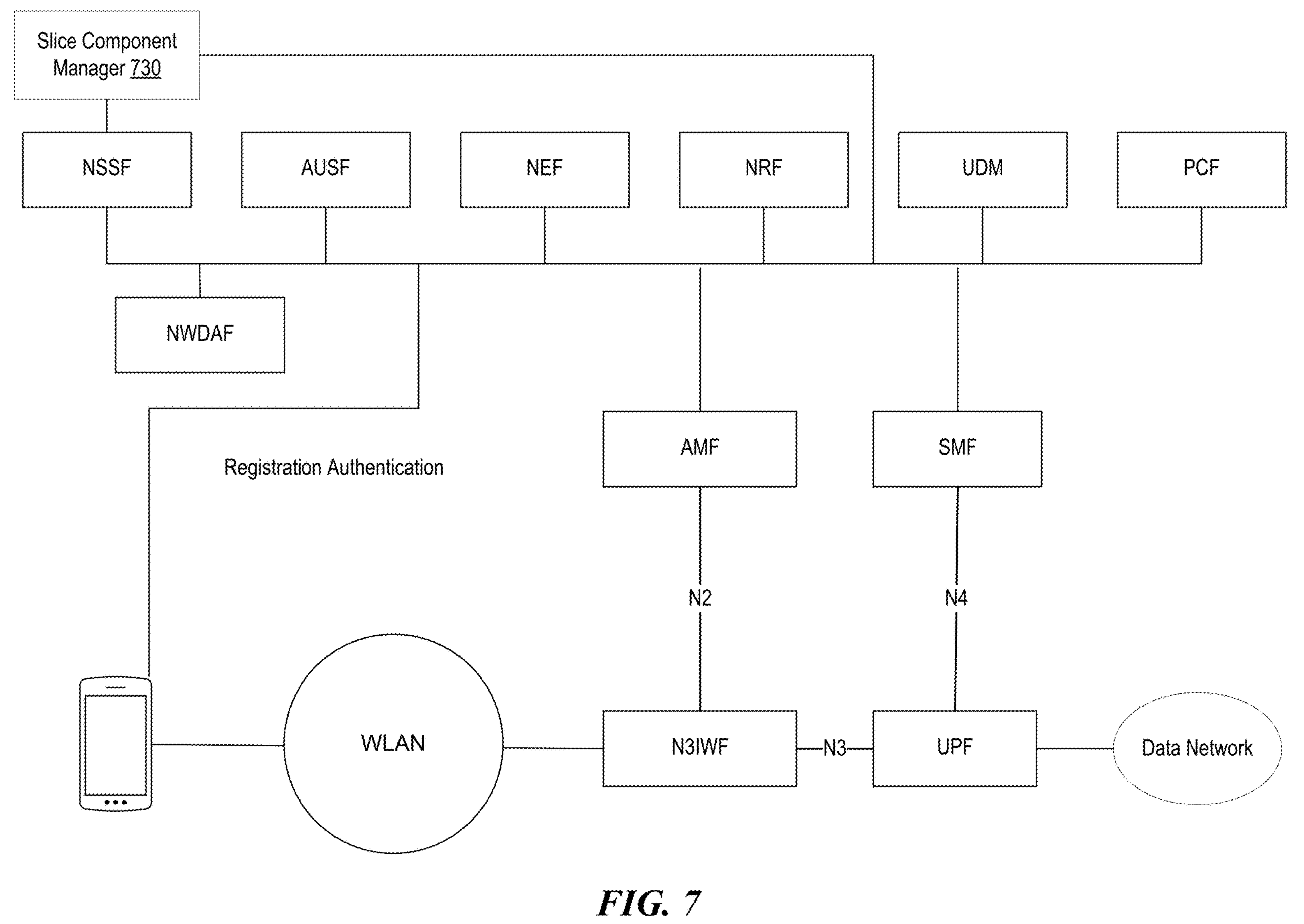
FIG. 7 illustrates an example architecture of interworking in accordance with one or more embodiments of the present technology.

In some embodiments, the slice component manager communicates with the core network to invoke the interworking with non-3GPP networks (e.g., untrusted WLAN, wired LAN) so that traffic can be different to different access points (e.g., via different access technologies, such as cellular, WiFi, etc.). FIG. 7 illustrates an example architecture of interworking in accordance with one or more embodiments of the present technology. As shown in FIG. 7, the slice component manager 730 monitors the network condition of the 3GPP network (e.g., via NWDAF) as well as the network condition of the non-3GPP network (e.g., via N3IWF). The slice component manager 730 then directs traffic between the 3GPP RAN (e.g., as shown in FIG. 2) and the Non-3GPP Interworking Function (N3IWF) so that network services can be provided to the UE via either trusted or non-trusted non-3GPP access networks when needed.

Figure 8:
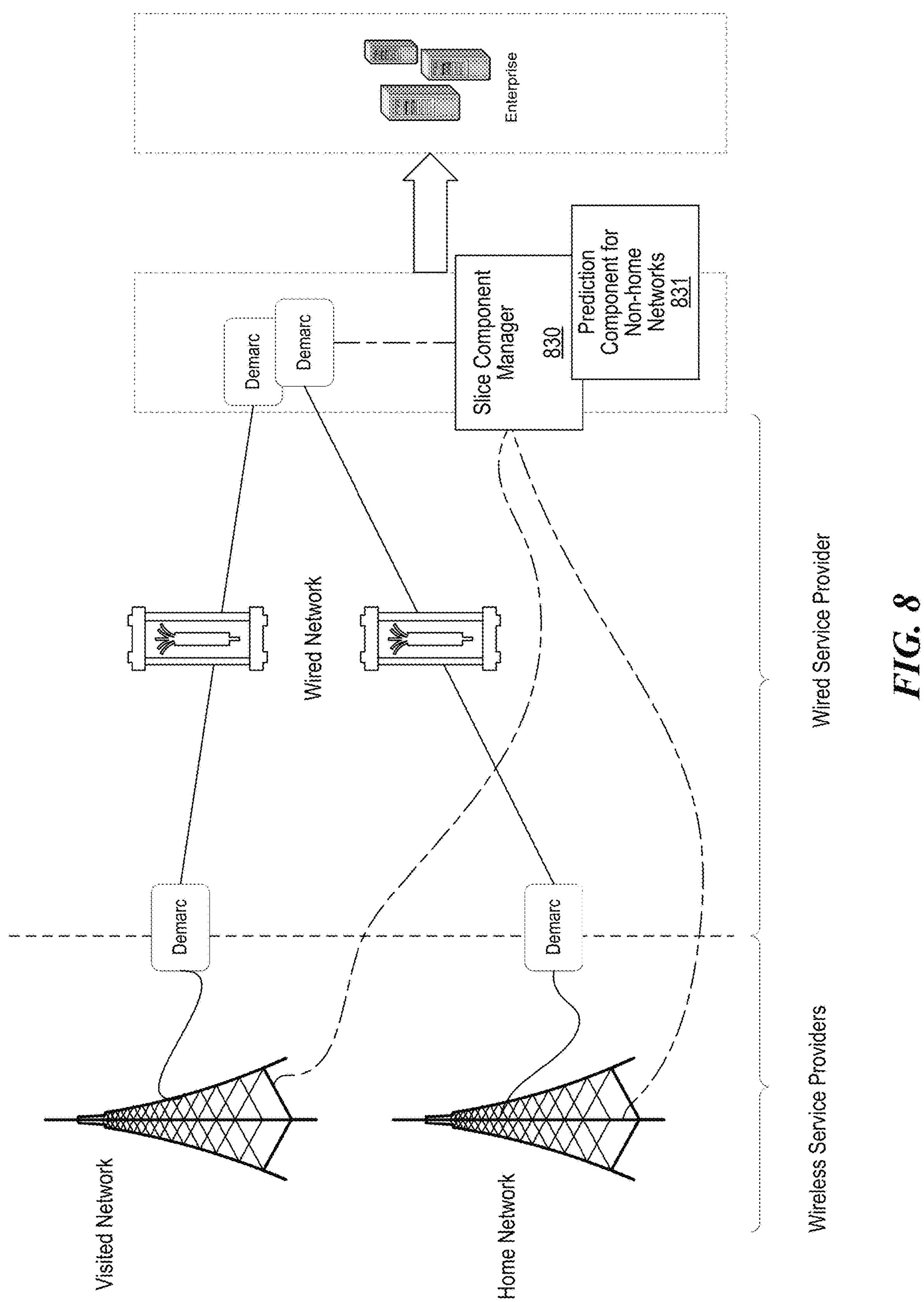
FIG. 8 an example wireless-wired architecture in accordance with one or more embodiments of the present technology.

For interworking between wireless network(s) and wired network(s), the slice component manager or the service orchestrator, which is connected to an entity like the NWDAF to get the measurements, can be connected to the demarcation (demarc) points of the enterprise network to gather measurement data from the wired network(s). FIG. 8 is an example wireless-wired architecture in accordance with one or more embodiments of the present technology. As shown in FIG. 8, the slice component manager 830 is deployed to be in communication with the demarc points of the wired network, as well as at the border between the home network and the visited network. As discussed above, between the wireless networks (e.g., the home network and the visited network), the slice component manager 830 can get network information from NWDAF/MDA (e.g., via the hSEPP or vSEPP) to predict network behavioral changes. Between the wireless and the wired networks, the slice component manager 830 can obtain information from the demarc points to determine the network conditions in the wired portion of the network.

The wired networks do not provide network functions such as NWDAF/MDA. In some implementations, the interface with the vSEPP is configured to provide access to NWDAF/MDA in the visited network to obtain analytical data. The slice component manager 830 can include a prediction component 831 for non-home networks (e.g., implemented using neural networks and/or artificial intelligence) to predict the future state of the other networks. The slice component manager 830 is then equipped with the necessary information to configure/reconfigure network slices and to redirect traffic as appropriate to meet the requirements of SLAs. In some embodiments, the traffic can be provided using a combination of the home network, visited network(s), other wireless access technologies such as WiFi (not shown in FIG. 8), and wired networks.

The slice component manager can be deployed in a variety of manners. In some embodiments, the slice component manager can be deployed in a network server in the core network as a separate NF (e.g., as shown in FIG. 6). In some embodiments, the slice component manager can be co-located with another NF in the core network (e.g., co-located with NSSF). In some embodiments, the slice component manager can be external to the core network and can be deployed as a service as part of the enterprise network or as a service to the enterprise network (e.g., as shown in FIG. 8).

With the adoption of the slice component manager, wireless service providers can gradually shift to become the primary service providers for enterprise networks, with wired network acting as a backup network resource, to enable a more flexible and distributed deployment of the enterprise networks that fits the evolving needs of enterprises.

Figure 9:
FIG. 9 is a flowchart representation of a method for providing a network service to an enterprise in compliance with an SLA in accordance with one or more embodiments of the present technology.
Figure 9:
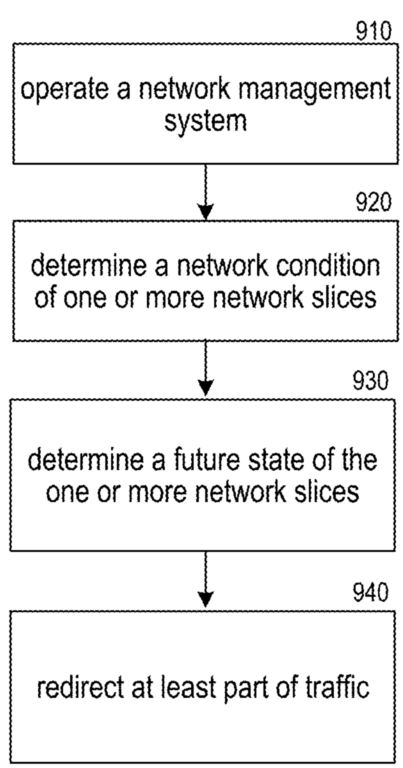

FIG. 9 is a flowchart representation of a method for providing a network service to an enterprise in compliance with a Service Level Agreement (SLA) in accordance with one or more embodiments of the present technology. The method 900 includes, at operation 910, operating a network management system that is in communication with a first cellular wireless network. The network management system is in further communication with a second cellular wireless network, a non-cellular wireless network, and a wired network. The method 900 includes, at operation 920, determining, by the network management system, a network condition of one or more network slices by monitoring network information of the one or more network slices associated with a communication session. The network information comprises a first set of information of the first cellular wireless network associated with the communication session, a second set of information obtained from the second cellular wireless network, a third set of information obtained from the non-cellular wireless network, and a fourth set of information obtained from the wired network. The method 900 includes, at operation 930, determining, by the network management system, a future state of the one or more network slices based on the network information for the network condition. The method 900 includes, at operation 940, redirecting at least part of traffic to the second cellular wireless network, the non-cellular wireless network, or the wired network.

Figure 10:
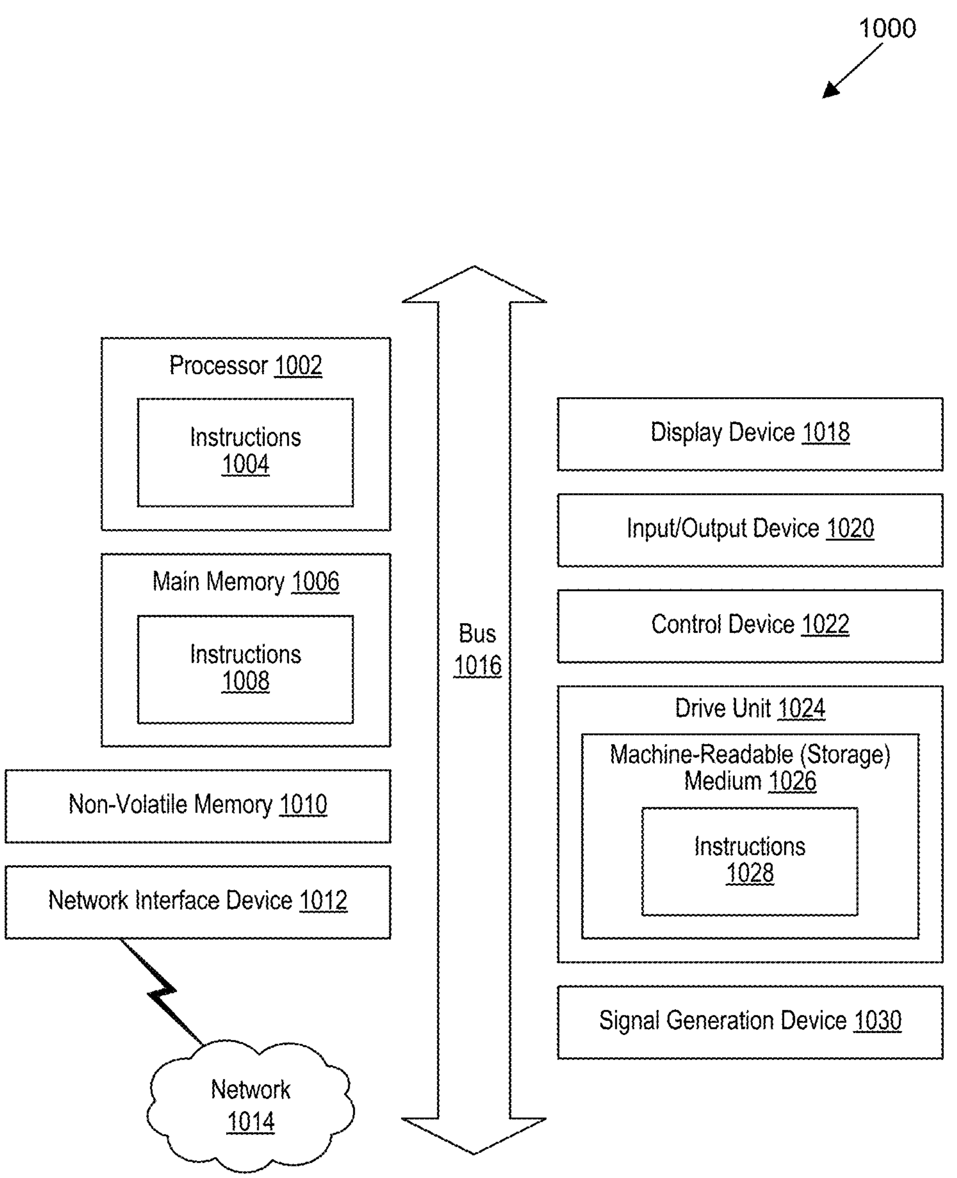
FIG. 10 is a block diagram that illustrates an example of a computer system in which at least some operations described herein can be implemented.

FIG. 10 is a block diagram that illustrates an example of a computer system 1000 in which at least some operations described herein can be implemented. As shown, the computer system 1000 can include one or more processors 1002, main memory 1006, non-volatile memory 1010, a network interface device 1012, a video display device 1018, an input/output device 1020, a control device 1022 (e.g., keyboard and pointing device), a drive unit 1024 that includes a machine-readable (storage) medium 1026, and a signal generation device 1030 that are communicatively connected to a bus 1016. The bus 1016 represents one or more physical buses and/or point-to-point connections that are connected by appropriate bridges, adapters, or controllers. Various common components (e.g., cache memory) are omitted from FIG. 10 for brevity. Instead, the computer system 1000 is intended to illustrate a hardware device on which components illustrated or described relative to the examples of the figures and any other components described in this specification can be implemented.

The computer system 1000 can take any suitable physical form. For example, the computing system 1000 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 1000. In some implementations, the computer system 1000 can be an embedded computer system, a system-on-chip (SOC), a single-board computer system (SBC), or a distributed system such as a mesh of computer systems, or it can include one or more cloud components in one or more networks. Where appropriate, one or more computer systems 1000 can perform operations in real-time, in near real-time, or in batch mode.

The network interface device 1012 enables the computing system 1000 to mediate data in a network 1014 with an entity that is external to the computing system 1000 through any communication protocol supported by the computing system 1000 and the external entity. Examples of the network interface device 1012 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 1006, non-volatile memory 1010, machine-readable medium 1026) can be local, remote, or distributed. Although shown as a single medium, the machine-readable medium 1026 can include multiple media (e.g., a centralized/distributed database and/or associated caches and servers) that store one or more sets of instructions 1028. The machine-readable medium 1026 can include any medium that is capable of storing, encoding, or carrying a set of instructions for execution by the computing system 1000. The machine-readable medium 1026 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 1010, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1004, 1008, 1028) set at various times in various memory and storage devices in computing device(s). When read and executed by the processor 1002, the instruction(s) cause the computing system 1000 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

The invention claimed is:

1. A system for implementing an enterprise network in compliance with a Service Level Agreement (SLA), comprising one or more processors that is in communication with a home wireless network associated with the enterprise network, wherein the one or more processors is further in communication with at least one visited wireless network and at least one demarcation point of a wired network associated with the enterprise network, and wherein the one or more processors is configured to:

determine a network condition by monitoring network information of one or more network slices associated with a communication session in the enterprise network, wherein the network information comprises:

a first set of information of the home wireless network associated with the communication session in the enterprise network, the first set of information comprising a Fifth-Generation Quality of Service (QoS) Indicator (5QI) associated with the one or more network slices, a second set of information obtained from the at least one visited wireless network, and a third set of information obtained from the at least one demarcation point of the wired network, wherein the third set of information includes network condition information associated with the wired network serving as a backup network for the enterprise network;

determine a future state of the one or more network slices based on the network information for the network condition; and reconfigure traffic associated with the communication session based on the future state, wherein the traffic is configured by at least one of:

(a) reallocating network resources for at least one of the one or more network slices based on the future state, or (b) redirecting at least part of the traffic to the at least one visited wireless network or the wired network.

2. The system of claim 1 further comprising:

a virtual infrastructure manager (VIM) and a virtual network function (VNF) manager.

3. The system of claim 2, wherein the VIM and the VNF manager are co-located or deployed in a distributed manner.

4. The system of claim 1, wherein the one or more processors is further in communication with at least one of a Network Data Analytics Function (NWDAF) or a Management Data Analytics (MDA) in the home wireless network.

5. The system of claim 1 further comprising:

a prediction component configured to predict the future state of the one or more network slices based on the second set of information and the third set of information for the network condition.

6. The system of claim 1, wherein the one or more processors is in communication with a Non-3GPP Interworking Function (N3IWF) to redirect at least part of the traffic to a non-3GPP access technology.

7. The system of claim 1, wherein the system is implemented as part of a core network of the home wireless network.

8. The system of claim 1, wherein the system is co-located with a Network Slice Selection Function (NSSF) in a core network of the home wireless network.

9. The system of claim 1, wherein the system is implemented as part of a cloud service in connection with the enterprise network.

10. A framework for providing a wireless-centric network service to an enterprise in compliance with a Service Level Agreement (SLA), comprising:

a first component in communication with a home wireless network associated with an enterprise network, wherein the first component is further in communication with at least one visited wireless network and at least one demarcation point of a wired network associated with the enterprise network, wherein the first component is configured to:

determine a network condition by monitoring network information of one or more network slices associated with a communication session in the enterprise network, wherein the network information comprises:

a first set of information of the home wireless network associated with the communication session in the enterprise network, the first set of information comprising a Fifth-Generation Quality of Service (QoS) Indicator (5QI) associated with the one or more network slices, a second set of information obtained from the at least one visited wireless network, and a third set of information obtained from the at least one demarcation point of the wired network, wherein the third set of information includes network condition information associated with the wired network serving as a backup network for the enterprise network;

determine a future state of the one or more network slices based on the network information for the network condition; and a second component configured to:

reconfigure traffic associated with the communication session based on the future state predicted by the first component, wherein the traffic is configured by at least one of:

(a) reallocating network resources for at least one of the one or more network slices based on the future state predicted by the first component, or (b) redirecting at least part of the traffic to the at least one visited wireless network or the wired network.

11. The framework of claim 10, wherein the first component is implemented as virtual infrastructure manager (VIM).

12. The framework of claim 10, wherein the second component is implemented as a virtual network function (VNF) manager.

13. The framework of claim 10, wherein the framework is implemented as part of a cloud service in connection with the enterprise network.

14. A method for implementing an enterprise network in compliance with a Service Level Agreement (SLA), the method comprising:

operating a network management system that is in communication with a home wireless network associated with the enterprise network, wherein the network management system is further in communication with at least one visited wireless network and at least one demarcation point of a wired network associated with the enterprise network;

determining, by the network management system, a network condition by monitoring network information of one or more network slices associated with a communication session in the enterprise network, wherein the network information comprises:

a first set of information of the home wireless network associated with the communication session in the enterprise network, the first set of information comprising a Fifth-Generation Quality of Service (QoS) Indicator (5QI) associated with the one or more network slices, a second set of information obtained from the at least one visited wireless network, and a third set of information obtained from the at least one demarcation point of the wired network, wherein the third set of information includes network condition information associated with the wired network serving as a backup network for the enterprise network;

determining, by the network management system, a future state of the one or more network slices based on the network information for the network condition; and reconfiguring, by the network management system, traffic associated with the communication session based on the future state, wherein the traffic is configured by at least one of:

(a) reallocating network resources for at least one of the one or more network slices based on the future state, or (b) redirecting at least part of the traffic to the at least one visited wireless network or the wired network.

15. The method of claim 14, wherein the network management system comprises a virtual infrastructure manager (VIM) and a virtual network function (VNF) manager.

16. The method of claim 15, wherein the VIM and the VNF manager are co-located or deployed in a distributed manner.

17. The method of claim 14, wherein the network management system is further in communication with at least one of a Network Data Analytics Function (NWDAF) or a Management Data Analytics (MDA) in the home wireless network.

18. The method of claim 14, wherein a prediction component of the network management system is configured to predict the future state of the one or more network slices based on the second set of information and the third set of information for the network condition.

19. The method of claim 14, wherein the network management system is in communication with a Non-3GPP Interworking Function (N3IWF) to redirect at least part of the traffic to a non-3GPP access technology.

20. The method of claim 14, wherein the network management system is implemented as part of a core network of the home wireless network.

* * * * *